(12) United States Patent
MacKinlay

(10) Patent No.: US 7,570,227 B2
(45) Date of Patent: Aug. 4, 2009

(54) SYSTEMS AND METHODS FOR MANAGING SEAMS

(75) Inventor: Jock D. MacKinlay, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1152 days.

(21) Appl. No.: 10/687,487

(22) Filed: Oct. 17, 2003

(65) Prior Publication Data

US 2005/0083331 A1 Apr. 21, 2005

(51) Int. Cl.
*G09G 5/00* (2006.01)
(52) U.S. Cl. .......................................... 345/1.3; 345/1.1
(58) Field of Classification Search ................... 345/1.1, 345/1.3, 903; 353/48; 349/6
See application file for complete search history.

(56) References Cited

U.S. PATENT DOCUMENTS

| | | | | |
|---|---|---|---|---|
| 3,139,793 | A | * | 7/1964 | Bradford et al. ............... 353/48 |
| 5,923,307 | A | * | 7/1999 | Hogle, IV ....................... 345/4 |
| 6,185,582 | B1 | | 2/2001 | Zellweger et al. |
| 6,256,649 | B1 | | 7/2001 | Mackinlay et al. |
| 6,344,836 | B1 | * | 2/2002 | Suzuki ........................ 345/2.1 |
| 6,611,241 | B1 | * | 8/2003 | Firester et al. ................ 345/1.3 |
| 2002/0080302 | A1 | * | 6/2002 | Dubin et al. ................... 349/73 |
| 2002/0085278 | A1 | | 7/2002 | Kolosowsky |
| 2003/0071832 | A1 | * | 4/2003 | Branson ..................... 345/698 |

OTHER PUBLICATIONS

Bartram, L. R., "Enhancing Information Visualization with Motion", Thesis, Simon Fraser University, Jun. 2001.
Applied Science Laboratories Model 501 and Model 504 Eye Tracking System Product Specifications, printed Sep. 24, 2003.
Chang, B. W. et al., "Animation: From Cartoon to the User Interface", in Proceedings of the Sixth Annual Symposium on User Interface Software and Technology, Atlanta, GA, p. 45-55, 1993.

(Continued)

*Primary Examiner*—Chanh Nguyen
*Assistant Examiner*—Calvin C Ma
(74) *Attorney, Agent, or Firm*—Oliff & Berridge, PLC

(57) ABSTRACT

Techniques are provided to manage seams between discrete displays. Output image information is determined at the level of an application output call, an operating system output call, a device driver, a video controller level or at any other output level. Display layout adjustments are applied to the output image information based on user input and/or the type and/or location of the output image information. Interpolable output image information and non-interpolable output image information are determined. Display layout adjustments of non-interpolable output image information selectively move the non-interpolable output image information away from the seam. Display layout adjustments of interpolable output image information at the seam selectively redraw the interpolable output image information through the seam. Techniques for applying seam information as a constraint in the initial layout of the output image information are also provided. Techniques of maintaining context within text and other high context output image information are provided in which portions of the display immediately before a seam are replicated onto the display immediately following the seam.

26 Claims, 18 Drawing Sheets

OTHER PUBLICATIONS

Czerwinski, M. et al., "Women Take a Wider View", Proceedings of the SIGCHI Conference on Human Factors in Computing Systems: changing our Wworld, changing ourselves, Apr. 2002.

Gaver, W. et al., "Effective Sounds in Complex Systems: The Arkola Simulation", in Proceedings of the SIGCHI Conference on Human Factors in Computing Systems: Reaching through Technology, Mar. 1991.

Henderson, D. et al., "Rooms: The Use of Multiple Virtual Workspaces to Reduce Space Contention in a Window-Based Graphical User Interface", ACM Transactions on Graphics (TOG) Jul. 1986.

Igarashi, T. et al., "Fluid Visualization of Spreadsheet Structures", IEEE Symposium on Visual Languages, p. 118-125, Halifax, Nova Scotia, Canada, Sep. 1998.

Panko, R., "What We Know About Spreadsheet Errors", Journal of End User Computing's Special Issue on Scaling Up End User's Development, p. 15-21, vol. 10, No. 2. Spring 1998.

Tan, D. et al., "Effects on Visual Separation and Physical Discontinuities when Distributing Information Across Multiple Displays", In M. Rauterberg et al. (Eds.), Human-Computer Interaction—Interact '03, IOS Press, 252-255. Copyright IFIP, 2003.

Baudisch, P. et al. "Drag-and-Pop and Drag-and-Pick: techniques for accessing remote screen content on touch- and pen-operated systems", in.

Jun Rekimoto and Masanori Saitoh, "Augmented Surfaces: A Spatially Continuous Workspace for Hybrid Computing Environments", Proceedings of CHI'99, pp. 378-385, 1999.

* cited by examiner

PRIOR ART

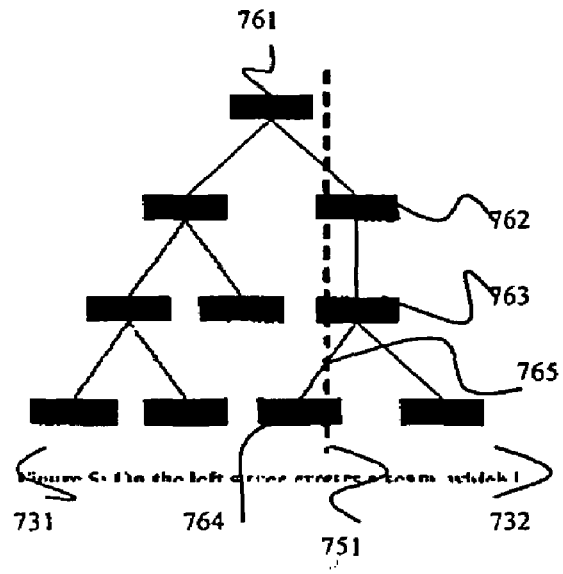
Fig. 16 PRIOR ART
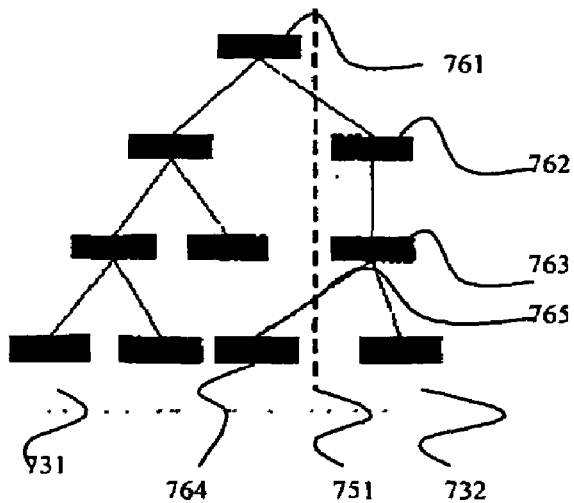
Fig. 17

Fig. 23

| DEVICE IDENTIFIER | DEVICE NAME | EDGE IDENTIFIER | BEZEL BASED SEAM INFORMATION |
|---|---|---|---|
| A1DE | NEC MultiSync 5A | 0 | {x1,y1; x2,y2; x3,y3; x4,y4} |
| A1DE | NEC MultiSync 5A | 1 | {x5,y5; x6,y6; x7,y7; x8,y8} |
| A1DE | NEC MultiSync 5A | 2 | {x9,y9; x10,y10; x11,y11; x12,y12} |
| . | . | . | . |
| . | . | . | . |
| D45E | E-PAPER | 9 | {x13,y13; x14,y14; x15,y15; x16,y16} |

| SEAM IDENTIFIER | SEAM INFORMATION |
|---|---|
| 0 | {"NEC MultiSync 5A".bezelInformation.leftedge + "NEC MultiSync 5A".bezelInformation.rightedge} |
| 1 | {1024,0; 1030,0; 1030,768; 1024,768} |
| 2 | {0,0; -10,0; -10,768; 0,768} |
| 3 | . |
| . | . |
| 9 | {2000,2000; 2010,2010; 2020,2005; 2015,1990; 2010,1990} |

1610  1620  1600

US 7,570,227 B2

SYSTEMS AND METHODS FOR MANAGING SEAMS

INCORPORATION BY REFERENCE

This Application incorporates by reference:

U.S. patent application Ser. No. 10/687,486, entitled "Systems and Methods for Shifting Attention Effectively" by Mackinlay et al., filed Oct. 17, 2003;

U.S. Pat. No. 6,256,649 entitled "Animated Spreadsheet for Dynamic Display of Constraint Graphs" by Mackinlay et al., filed Jun. 17, 1998; and U.S. Pat. No. 6,185,582, entitled "Spreadsheet View Enhancement System" by Zellweger et al., filed Jun. 17, 1998; each in their entirety.

BACKGROUND OF THE INVENTION

1. Field of Invention

This invention relates to managing seams in video display systems.

2. Description of Related Art

Knowledge workers are called upon to analyze and synthesize new information from ever increasing volumes of information. Although visualization tools can help with these tasks, conventional displays systems limit the amount of information that can be simultaneously displayed. Instead, different application windows are opened and closed depending on the current focus of attention. Although, modern computer and display systems can open and close windows relatively quickly, the limited size of these systems requires the user to re-focus attention onto these windowing and application management sub-tasks.

Some of these problems are addressed by increasing the display size. However, difficulties in manufacturing larger display systems result in larger display systems that are more expensive per square inch than smaller display systems. Composite display technologies such as nVidia's nView and ATI Technologies Hydravision attempt to address this problem by allowing multiple display views of a single desktop. However, these conventional multi-monitor display systems merely add views into a convention virtual desktop. The multiple discrete displays are not fully integrated into a single cohesive display system. Information presented in these conventional display-spanning windows is disjointed and difficult to read.

Some other manufacturers have attempted to overcome these seam display problems by using lens placed over the display to distort the image around the seam. However, these systems require the installation of lens hardware components. Moreover, these systems do not work well with larger seam sizes since they depend on optically bending the image from the displays on either side of the seam.

SUMMARY OF THE INVENTION

Thus, systems and methods that manage seams would be useful. The systems and methods of this invention, manage information presented on discrete displays to mitigate the effect of seams.

BRIEF DESCRIPTION OF THE DRAWINGS

FIG. 14 shows conventional output image information generated by a non-seam-aware spreadsheet application;

FIG. 15 shows output image information generated by an exemplary seam-aware spreadsheet application according to an embodiment of this invention;

FIG. 16 shows output image information generated by a conventional graphics application;

FIG. 17 shows exemplary output image information generated by a graphics application according to an embodiment of this invention;

FIG. 23 shows an exemplary data structure for storing bezel based seam information according to an embodiment of this invention; and FIG. 24 shows an exemplary data structure for storing seam information according to an embodiment of this invention.

DETAILED DESCRIPTION OF EXEMPLARY EMBODIMENTS

Figure 1:
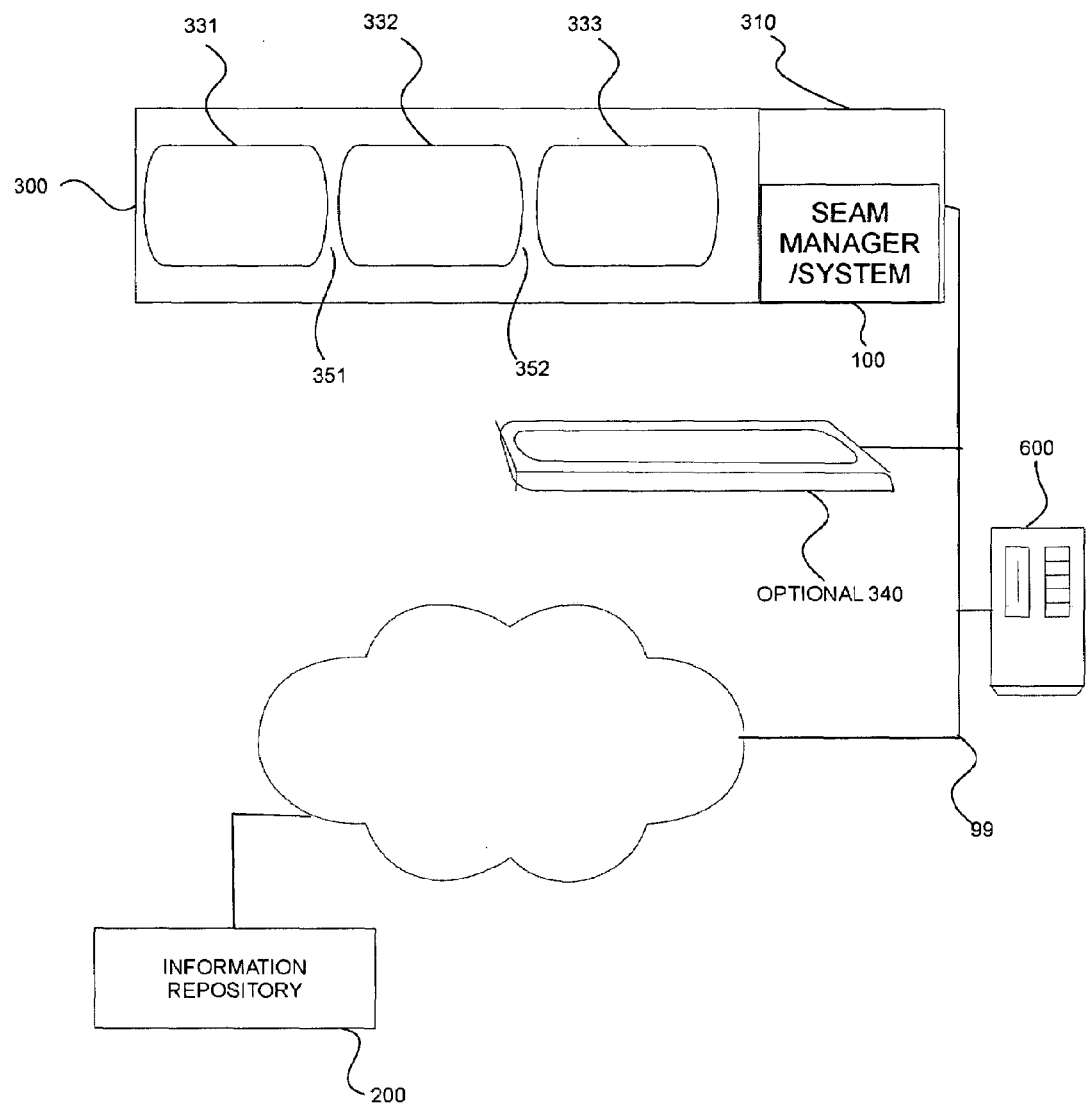
FIG. 1 is an overview of a first exemplary embodiment of a seam manager or system according to this invention.

FIG. 1 is an overview of first exemplary embodiment of a seam manager or system 100 according to this invention. An exemplary composite wideband display 300 is comprised of first, second and third discrete displays 331-333 separated by first and second seams 351-352, an optional input device 340 and an optional display controller 310. The wideband display controller 310 contains a seam manager or system 100. The seam manager or system 100 integrates the composite wideband display 300 by mitigating the effect of the seams that occur between the first, second and third discrete displays 331-333. The composite wideband display may be composed of conventional monitors, e-paper based displays, projected displays, mobile and/or portable displays or any other type of display, either alone in any combination. The optional display controller 310 may also coordinate input from an optional keyboard input device 340. The composite wideband display 300 includes an embedded seam manager or system 100. The composite wideband display 300 is connectable via communications links 99 to an information repository 200 and personal computer 600.

The information repository 200 may be a web server, a digital library or any other known or later developed source of information. The information repository may serve documents encoded in HTML, XML, WML, Microsoft Word,® Microsoft Excel,® Adobe PDF,® or any other known or later developed format.

In various exemplary embodiments according to this invention, a user of the composite wideband display 300 uses optional keyboard input device 340 to request the display of output image information from a spreadsheet stored in the information repository 200. The optional keyboard input device 340 may be a voice controller, a mouse or any known or later developed input device. The large size of the composite wideband display 300 allows the simultaneous presentation of much of the user's requested information.

The seams between the first and second discrete displays 331-333 are mitigated by the seam manager or system 100 which mediates the display of the output image information onto the composite display. Interpolable output image information is determined. Interpolable output image information includes but is not limited to arcs, lines, circles or other regular featured objects having omitted portions predictable from identified features. A determination is made whether repetition of output image information will be used to mitigate the effect of the seams based on user input and/or the type of the output image information. If repetition is not selected, the interpolable output information is then drawn across the seam and the non-interpolable output image information is moved off the seam. In various other exemplary embodiments according to this invention, a non-zero repetition value repeats high context non-interpolable output image information appearing before a seam onto the display following the seam. High context non-interpolable output image information may include, but is not limited to text and/or numeric information.

For example, nodes of a tree or other graph falling on the seam may be determined. The nodes are non-interpolable output image information since their location and/or presence cannot be predicted. Display layout adjustments are determined to move the nodes off the seam to one of the adjacent displays. The interpolable output image information is redrawn through the seam to reconnect to any non-interpolable elements that were moved. Thus, arcs, lines and other interpolable output image information interrupted by the seam are redrawn through the seam. It will be apparent that various exemplary display layout techniques may be used to adjust the output image without departing from the scope of this invention.

Thus, when an attention shifting display element, is displayed diagonally across the first, second and third displays 331-333, the angle and length of each diagonal line affected by the interrupting seams 351-352 is adjusted. Since each of the diagonal lines is interpolable, the diagonal line or output image information is adjusted and redrawn through the seam.

In one of various exemplary embodiments according to this invention, non-interpolable output image information is redrawn with the seam added as a constraint in the display layout adjustments. For example, the widths of spreadsheet columns preceding a seam are adjusted to avoid interrupting columns of high context information. However, it will be apparent that any display layout method that reduces the impact of the seam may also be used in the practice of this invention.

Figure 2:
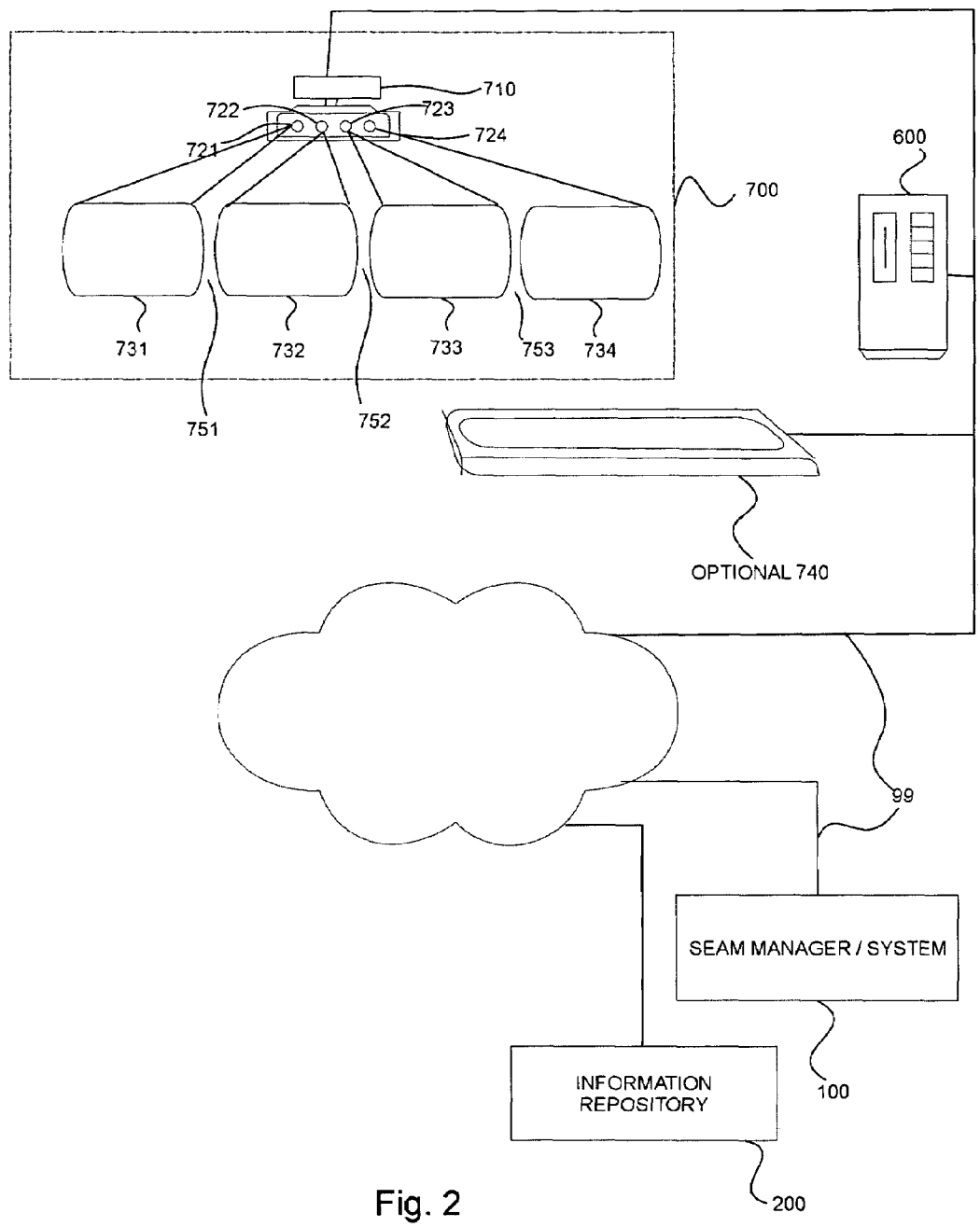
FIG. 2 is an overview of a second exemplary embodiment of a seam manager or system according to this invention.

FIG. 2 is an overview of a second exemplary embodiment of a seam manager or system 100 according to this invention. In the second exemplary embodiment according to this invention, a composite projector wideband display 700 is comprised of first, second, third and fourth projector display devices 721, 722, 723 and 724. The projector wideband display 700 is connectable via communications links 99 to the seam manager or system 100.

The first, second, third and fourth projectors 721-724 of the composite wideband display 700 are controlled by a display controller 710. The projectors 721-724 project information onto first, second, third and fourth projector displays 731-734 respectively. Projector displays 731-734 are separated by seams 751-753. The composite projector wideband display is connectable to an optional keyboard 740, a personal computer 600, a seam manager or system 100 and an information repository 200.

A user of the composite projector wideband display 700 requests the display of output image information relevant to the current task. The output image information may include output image information from spreadsheets, word processing documents, information visualizations or any known or later developed information source. The large size of the composite projector wideband display 700 allows the display of much of the requested output image information. The non-interpolable and interpolable output image information at or near the seam is determined. Based on user selections or input, and/or a dynamically determined repetition value, a portion of non-interpolable output image information on a first side of a seam is determined. The non-interpolable output information is then repeated on the subsequent display following the seam to preserve context information. If the repetition value is zero, then no repetition is performed and non-interpolable output image information is moved off the seam and interpolable output image information at/or near the seam, is redrawn through the seam. For example, if the repetition value is zero, non-interpolable output image information is moved off the seam. Interpolable output image information, such as arcs connecting the nodes in the graph are redrawn through the seam. Adjustments to portions of the interpolable output image information are made to reconnect moved nodes and to maintain the perception of an integrated display.

Figure 3:
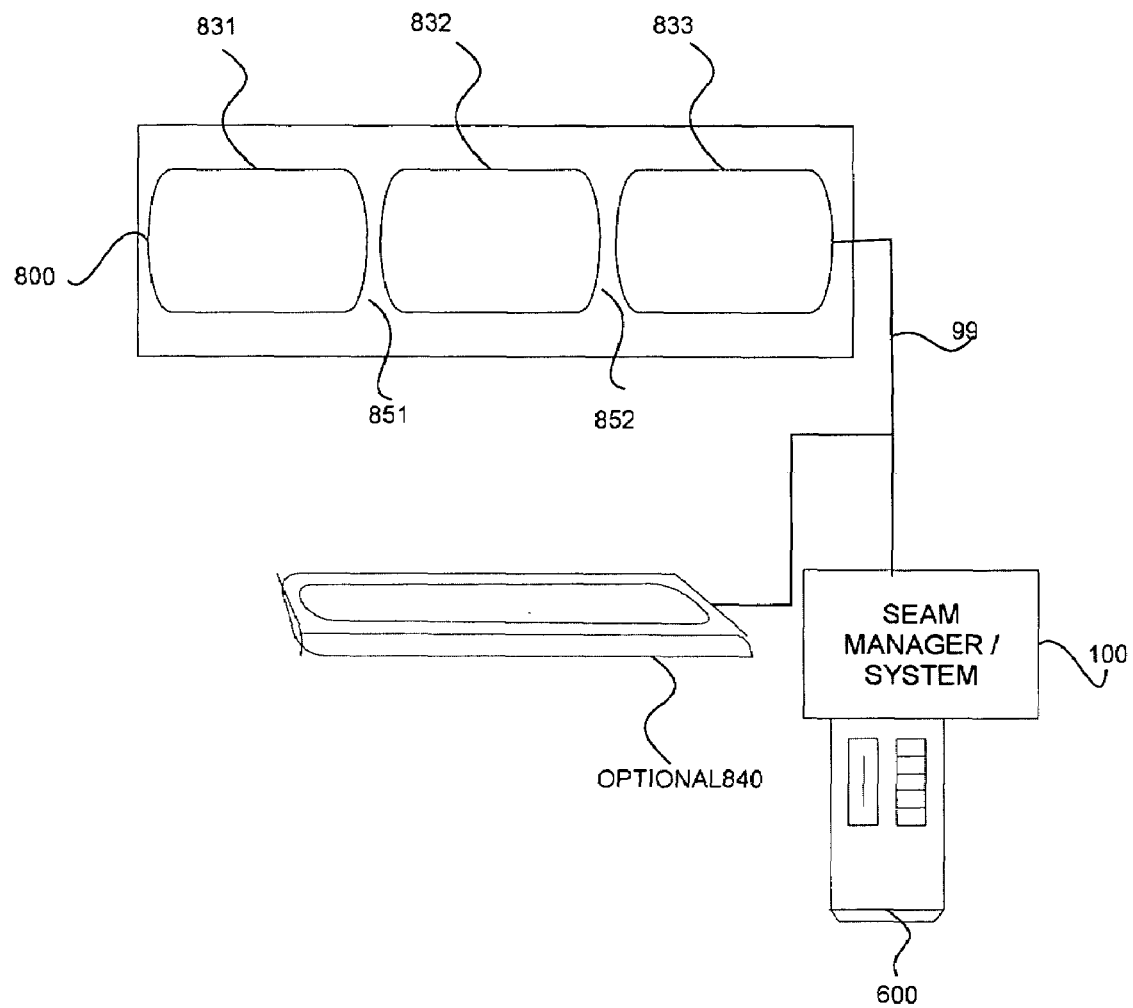
FIG. 3 is an overview of a third exemplary embodiment of a seam manager or system according to this invention.

FIG. 3 is an overview of a third exemplary embodiment of a seam manager or system 100 according to this invention. The multi-monitor wideband display 800 is comprised of first, second and third displays 831-833 separated by first and second seams.

The multi-monitor wideband display 800 is connectable via communications links 99 to an optional keyboard 840 and a personal computer 600 containing a seam manager or system 100. A user of the personal computer 600 requests the display of output image information relevant to completing a task. The task related output image information may be drawn from one or more applications such as database system, document viewers, visualization systems and the like. In various exemplary embodiments according to this invention, application windows may span multiple displays.

The seam manager or system 100, embedded in the personal computer 600 mediates the display of output image information to the multi-monitor wideband display by determining display layout adjustments for the output image information. Non-interpolable output image information is moved off the seam. Interpolable output image information appearing at the seam is selectively redrawn through the seam to integrate the displays while preserving salient non-interpolable output image information. In various other exemplary embodiments according to this invention, high context output image information is repeated on either side of the seam. The repetition of high context information, such as text, helps to maintain the context as attention is shifted across the seam. In this way, the discrete projected displays are integrated into a single cohesive whole.

Figure 4:
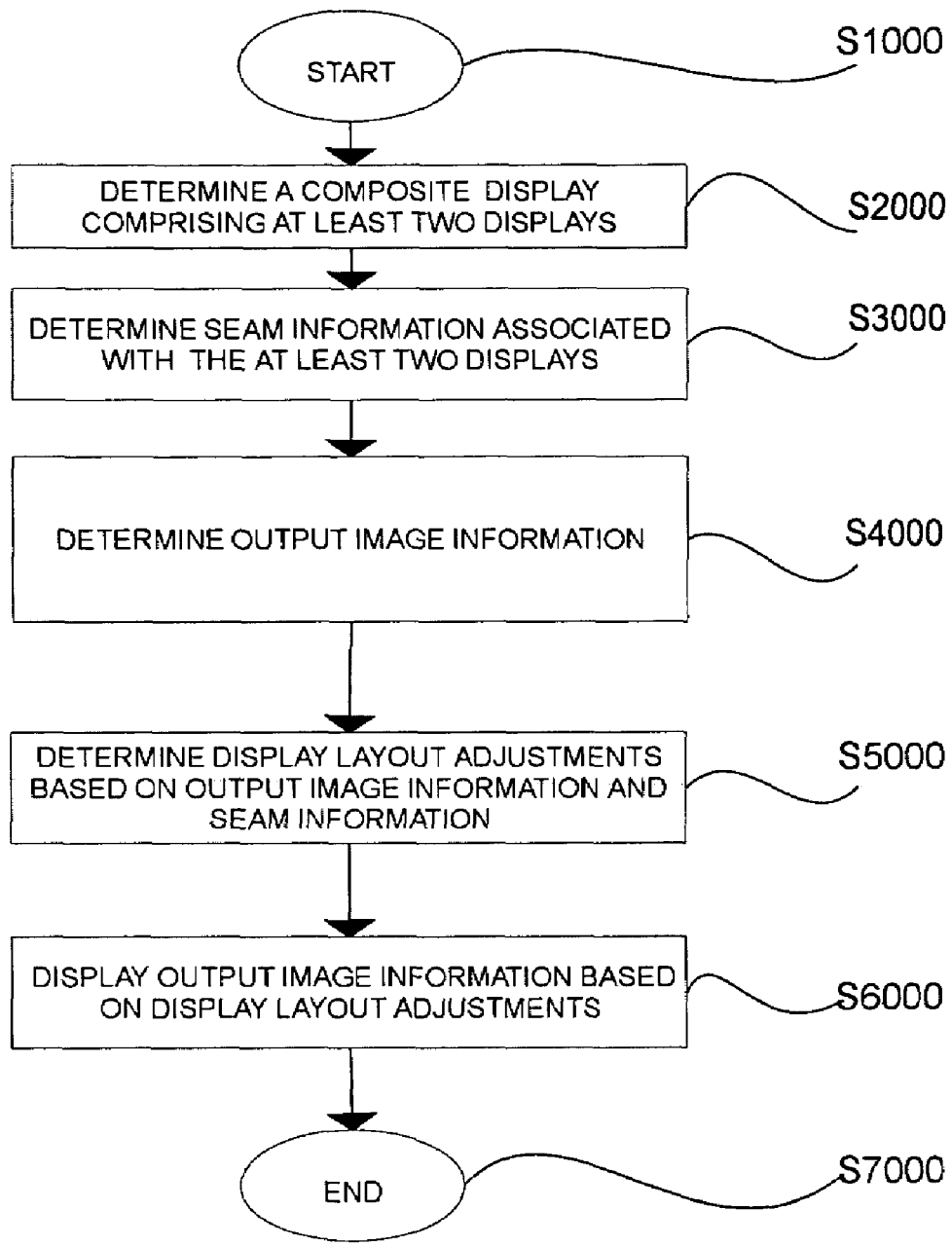
FIG. 4 is a flowchart of an exemplary method of managing seams according to an embodiment of this invention.

FIG. 4 is a flowchart of an exemplary method of managing seams according to an embodiment of this invention. The process begins at step S1000 and immediately continues to step S2000.

In step S2000, a composite wideband display comprising at least two displays is determined. In various exemplary embodiments according to this invention, the composite wideband display comprises two or more discrete displays that each display portions of the output image information. Composite wideband display systems typically cost less since they allow the use of relatively inexpensive off the shelf displays.

When inexpensive displays are combined under the control of a video control routine or a video controller, the set of discrete displays provide views into a contiguous virtual display space. Any number of discrete displays of any size or shape may be combined into a composite wideband display. Moreover, stationary or mobile discrete displays may be dynamically added to and removed from the composite display. Thus, in various other exemplary embodiments according to this invention, a personal digital assistant (PDA) or other portable personal displays may be added to a composite display that includes a wall display, a projection display and the like. After the composite display is determined, control continues to step S3000.

Information about the seams between each of the discrete displays is determined in step S3000. At least one seam exists between a pair of displays. For example, when displays are combined together vertically or horizontally, each display is associated with a seam along the shared edges.

In various exemplary embodiments according to this invention, each seam is associated with a seamidentifier. The seamidentifier is used to store and retrieve information describing the seam. For example, a seam "0" may be associated with one or more sets of x, y and z coordinates describing the dimensions of the seam in terms of one or more polygons of any size or shape. A fixed point of reference associated with a portion of one of the displays may serve as the origin of the coordinate system. However, it will be apparent that any consistent reference point may be used. After the seam information is determined, control continues to step S4000.

In step S4000, the output image information to be displayed is determined. The output image information may include text from a word processor, a graphic application, a visualization system, a spreadsheet application or any known or later developed source of output image information. After the output image information is determined, control continues to step S5000 where the display layout adjustments are determined based on the output image information and the seam information. In other various exemplary embodiments according to this invention, a seam manager or system may be embedded into application software such as a word processor, a spreadsheet application and the like. The embedded seam manager performs display layout adjustments to output image information based on the determined seam information. The seam based display layout constraints imposed by the display layout adjustments mitigate the effect of the seams on the output image information.

It will be apparent that the seam manager or system can mediate access to the display at an application, an operating system, a video controller, a composite video controller or any other level, without departing from the scope of this invention. Output image information available at these levels is then passed to the seam manager. The seam manager or routine applies display layout adjustments to the output image information. In this way, the additional programming required to implement the seam manager or system is reduced. For example, a seam-aware application containing an embedded seam manager performs calls to an embedded seam manager or system. Seam information concerning the size and location of each seam affecting the application output information is retrieved. Display layout adjustments are performed on the output image information based on the determined seam information.

In still other embodiments, display layout adjustments are determined for textually oriented output image information such that a repetition area immediately preceding a seam is defined. The repetition area preceding a seam reflects output image information repeated at the beginning of the display following the seam. Thus, for the left-right and top-bottom text orientation of the English language, the output image information at the rightmost edge of a display is repeated at the leftmost edge of the next display.

The characters, words, tokens or other information in the repetition area of a display are repeated at the beginning of the next display. This helps the user maintain context when attention is shifted across the seam. It will be apparent that in various exemplary embodiments according to this invention, the width of the repetition area in words tokens, pixels and the like is adjustable. If the width of the repetition area is zero, then no repetition is performed. Repetition of interrupted output image information may be useful when the output image information is highly dependent on context. For example, characters of a word in a sentence depend on the context provided by adjacent characters for their meaning. Therefore, when a seam interrupts the characters in a word, the word becomes difficult to read.

In contrast, circles, arcs and other less contextually dependent output image information are interpolated by the human brain from outlines. When this type of reduced context or interpolable output information is interrupted by a seam, omitted portions are filled-in by the cognitive processes of the brain and the whole object is recognized. Therefore, in various embodiments according to this invention, the reduced context output information is redrawn so that the seam is treated as part of the display area. This avoids disturbing the interpolation of the objects.

The output image information may be associated with non-interpolable object oriented or object addressable output image information. For example, the nodes in a connected graph may be addressed, clipped and/or moved. Display layout adjustments may be used to optionally move the nodes off determined seams. Node connecting arcs and lines or other interpolable output image information are then redrawn across the seam. In this way, segments of arcs that cross seams are interpolated and visually fused together. After the display layout adjustments are determined, control continues to step S6000. In step S6000, the output image information is displayed based on the determined display layout adjustments. Control then continues to step S7000 and the process ends.

Figure 5:
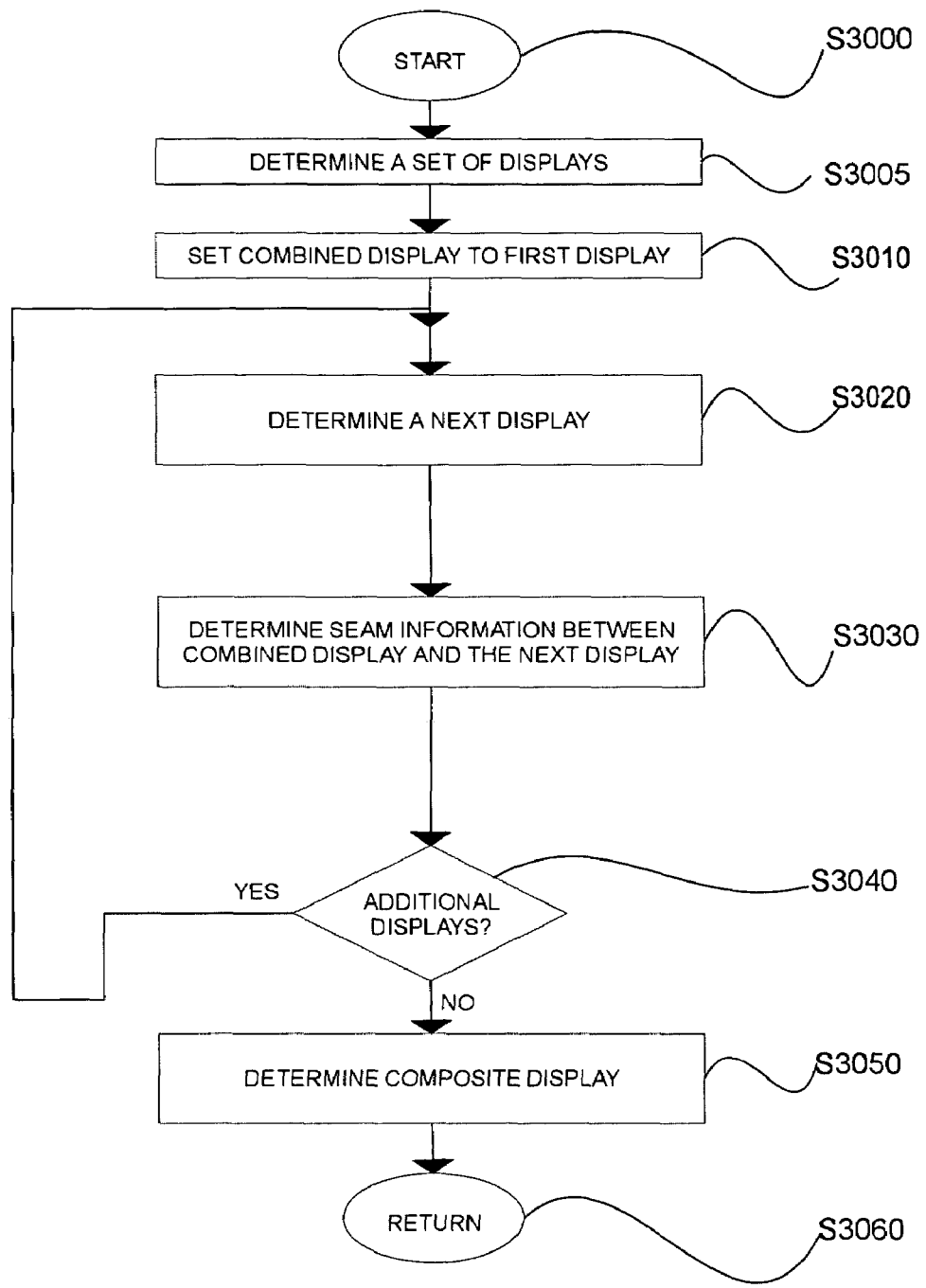
FIG. 5 is an expanded flowchart of an exemplary method of determining a composite display according to this invention.

FIG. 5 is an expanded flowchart of an exemplary method of determining a composite display according to this invention. The process begins at step S3000 and immediately continues to step S3005.

In step S3005, the set of displays to be combined into the composite display is determined. In one of the various exemplary embodiments according to this invention, each display in the set of displays is the same model display made by the same manufacturer. Identical model displays will have the same bezel dimensions surrounding the discrete displays. Seam information between adjacent displays is then determined based on the sum of the bezel information associated with the joining edge of each display. Each display in the set of displays is identified with a display identifier to store and retrieve bezel based seam information. Once the set of displays is determined, control continues to step S3010.

In step S3010, a first display is selected from among the set of displays. The first display is then set as the combined composite display. Control then continues to step S3020 where the next display is selected from the set of displays. The next display is typically the same model and/or manufacturer as the first display. However, in various other exemplary embodiments according to this invention, the next display may be a different model and/or manufacturer. For example, a larger 19-inch central display may be combined with two flanking 15-inch displays to create a composite wideband display based on two different display models. After the next display is determined, control continues to step S3030.

In step S3030, information describing the seams between the composite display and the next display are determined. In various exemplary embodiments according to this invention, the display identifier is then used to retrieve the relevant bezel and/or seam information associated with a display. That is, each display is associated with a bezel portion along one or more of the edges of the display. As the next display is combined with the composite display, the bezel information for each display along either side of the joining edge is combined to form the seam information.

For example, information describing the seam between a first and second display is determined by adding the bezel information for the joining edge of the first display to the bezel information for the joining edge of the second display. However, it should be apparent that the seam information may also be determined dynamically, entered manually or determined using any known or later developed seam determination method.

The determined seam information is then optionally stored in a seam information storage structure, such as a memory or the like. In various exemplary embodiments according to this invention, the bezel and/or seam information is optionally stored in an augmented termcap file, a device configuration file or any known or later developed storage structure associated with the type of display. This allows physical seam and/or bezel dimensions to be determined once for each type of display and then re-used.

Adjustments to the seam information based on whether the display surface is curved or flat and the angle at which the displays meet may also be encoded in the augmented termcap file or any later developed seam information storage structure.

In various other exemplary embodiments according to this invention, a seam calibration routine or tool may be used to directly determine seam information. For example, the seam information may be determined by placing a diagonal display and seam spanning line across the discrete displays. The mis-aligned line is adjusted under user control to visually align across the seam. The seam is determined based on the adjustments and the dimensions of the screen.

In various other exemplary embodiments according to this invention, an exemplary seam calibration/measurement tool comprising a measuring portion and a photo-detector is used to selectively enable pixels occurring along opposite sides of a seam. As the tool is moved along the seam, pixels on the displays to be joined are activated and the distance and angle between the pixels dynamically determined by sensors in the calibration tool. The dynamically determined area between the two displays defines the seam information. It will be apparent however that any known or later developed method of determining seam information may also be used without departing from the scope of this invention. After the seam information is determined, control continues to step S3040.

In step S3040, a determination is made whether additional displays remain to be combined into the composite display. If it is determined that there are additional displays to be combined, control continues to step S3020. Steps S3020-S3040 are repeated until it is determined in step S3040 that no additional displays remain. Control then continues to step S3050.

In step S3050, the composite display is determined. The composite display is based on the determined seams and the view area of the combined set of displays. In various exemplary embodiments according to this invention, the displays are integrated into a single composite display by a video controller or managed by a software routine in a computer. Discrete displays may also be added and removed from a composite display at any time. Moreover, one or more of the discrete displays may be mobile or movable display devices such as personal digital assistants (PDAs) and the like. After the composite display is determined, control continues to step S3060 and the process returns to step S3000 of FIG. 4.

Figure 6:
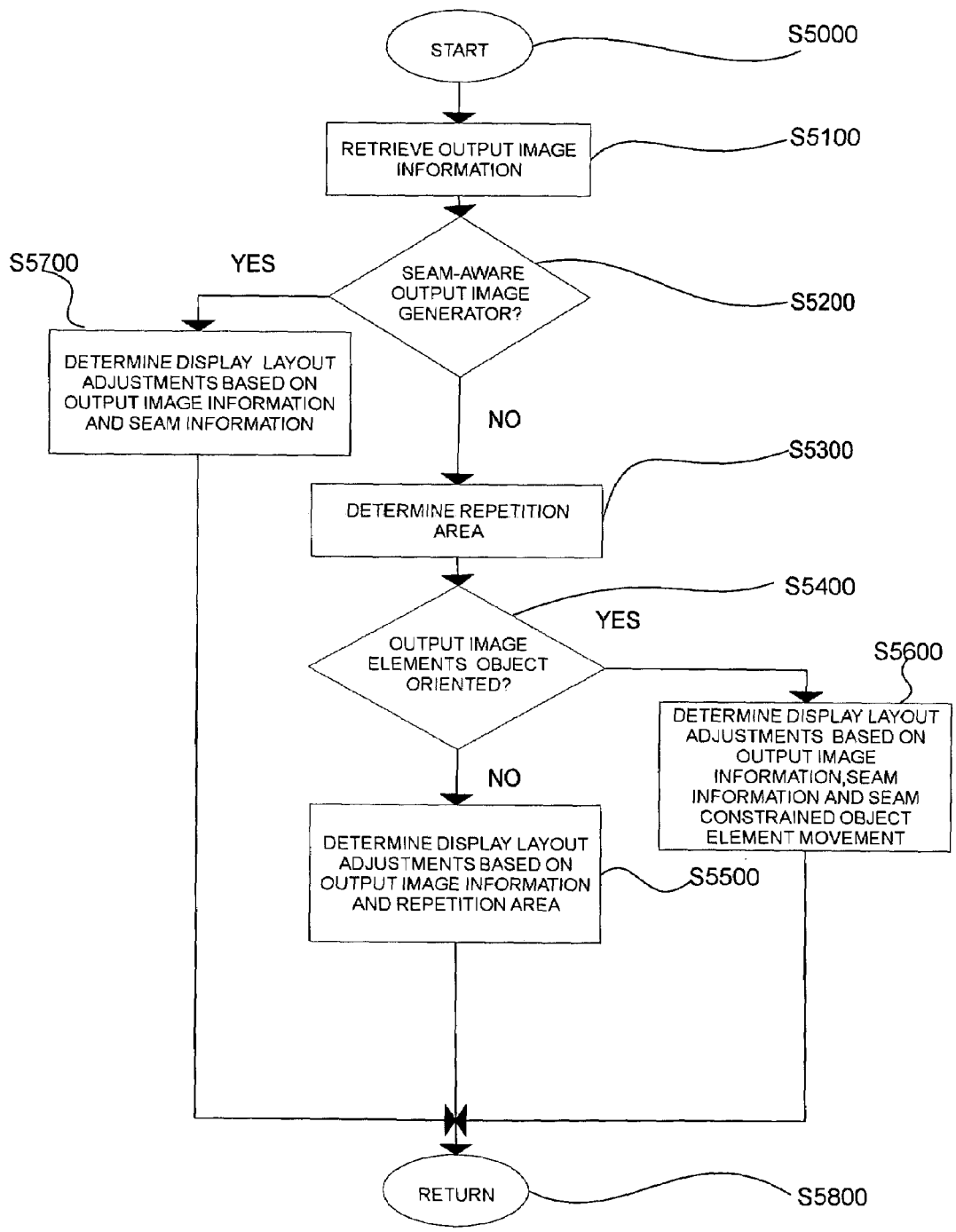
FIG. 6 is an exemplary method of determining display layout adjustments according to an embodiment of this invention.

FIG. 6 is an exemplary method of determining display layout adjustments according to an embodiment of this invention. The process begins at step S5000 and immediately continues to step S5100.

In step S5100, the output image information is retrieved. The output information may be retrieved directly from the video memory of a video manager or video controller, by intercepting operating system output calls, accessed through an application program interface call, or retrieved using any other known or later developed technique. For example, the output image information from a spreadsheet application, such as Microsoft's Excel or IBM's Lotus 123, is received by a seam-aware video-controller containing an embedded seam manager. The seam manager in the seam-aware video-controller retrieves output image information generated by a spreadsheet application by directly accessing the video controller memory.

In various exemplary embodiments according to this invention, a graphics context provides seam-awareness support for applications through an image buffer. Graphics context information and an output image information buffer are passed to the paint or output method of an application. If the application is later determined to be seam-aware, seam information provided in the graphic context is used to constrain the rendering of the of application information to the output image information buffer. Otherwise, if the application is not seam-aware, the information is also rendered to the output image information buffer. The seam manager then retrieves the output image information from the output image information buffer and adjusts the display layouts. After the output image information is retrieved, control continues to step S5200.

A determination is made as to whether the output image generating application is seam-aware in step S5200. For example, an application is seam aware if it includes seam information in adjusting and/or performing the display layout of the output image information. Thus, a wideband spreadsheet application that uses seam information to adjust the column widths that avoid interrupting the output image information is seam-aware. Seam aware applications may directly include a seam manager or routine or may include calls from the application to an operating system level or external seam manager or routine. If the application generating the output image information is determined to be seam-aware, control continues to step S5700.

In step S5700, display layout adjustments are determined based on the output image information and seam information. Output image information originating from a seam-aware application and/or seam-aware operating system environment is constrained or adjusted by the seam manager during the generation of the output image information. Control then continues to step S5800 and the process returns to step S6000 of FIG. 4.

If a determination is made that the application or generator of the output image information is not seam-aware, control continues to step S5300. For example, non-seam aware output image generators include, but are not limited to, word processors, spreadsheet applications and visualization tools. After the seam-awareness of the application is determined, control continues to step S5300.

In step S5300, a repetition area associated with each of the displays is determined. The repetition area may range from zero to the width of a discrete display. The repetition area reflects the portion of the discrete display adjacent to a seam that is repeated to a first portion of the display following the seam. Repetition areas larger than zero may be used to repeat high context output image information to mitigate the effects of the seam. Repetition is useful when the output information is difficult to assimilate without some of the original context. For example, individual characters have little meaning in English without the context provided by the surrounding characters. Interruptions in the normal grouping of characters or tokens that make up words or sentences make the text difficult to follow. Presenting context information from the repetition area preceding a seam onto the display following the seam reinforces the perception of a completely integrated display. The size of the repetition area reflects the amount of contextual output image information that will be repeated.

A seam interrupts the displayed phrase; "The man in the dark raincoat was last seen in front of the blue car" on a conventional composite display system. The first line on the first display reads "The man in t" while the first line on the second display reads "he dark". The interruption caused by the seam makes it difficult to understand the words and hinders the flow of the sentence. However, the focal transition across the seam is eased by the repetition of contextual information in the repetition area of the first display and the repetition area of the next display. In various exemplary embodiments according to this invention, the size of the repetition area may be adjusted based on a user profile, the output information, the seam information or any other information useful in determining the amount of context to be provided. It will be apparent that a display may be joined along multiple seams to other displays with repetition areas preceding and following each seam. Although for clarity of discussion, only a single seam has been described in detail, it will be apparent that any number of seams may be managed by the disclosed systems and methods without departing from the scope of this invention. After the repetition area is determined, control continues to step S5400.

A determination is made as to whether the output information elements are individually addressable or object oriented in step S5400. Object oriented output image elements may include but are not limited to individually addressable elements. For example, nodes in a tree that can be clipped and/or moved off a seam are object oriented graphic elements. However, it will be apparent that any known or later developed output image element that can be clipped and/or moved is an object oriented output image element useable in the practice of this invention.

If it is determined that the output image elements are object oriented, control continues to step S5600 where display layout adjustments are determined. The display layout adjustments are based on the output image information, seam information and the seam constrained object movement. For example, if graphic objects within the output image information are non-interpolable and/or individually addressable/moveable, then graphic objects falling on the seam are moved off the seam to either side. Non-interpolable output image information is output image information that cannot be easily determined based on the outline features of the object. For example, several same-curvature arcs all centered and equidistant from a common point provide the outline of a circle. Similarly, two short lines that are in alignment provide the outline of a longer line. Graphical objects for which omitted portions cannot be predicted are non-interpolable. Interpolable connecting elements such as arcs, lines circles and the like are adjusted and drawn across the seam since the features of these graphic objects can be predicted and/or interpolated. After the display layout adjustments have been determined, control continues to step S5800 of FIG. 5 and continues to step S6000.

If it is determined in step S5400 that the output image elements are not object oriented, control continues to step S5500. In step S5500 the display layout adjustments are determined based on the output image information and the determined repetition area. If the repetition area is equal to zero then no repetition occurs and the objects are rendered across the seam. If the size of the repetition area is greater than zero then the output image information in the repetition area before the seam is repeated into the display following the seam.

For example, for English language textual information with a left to right orientation, output image information appearing in the repetition area at the right most area of a display before the seam is repeated into a repetition area at the beginning or leftmost area of the display after the seam. It will be apparent however, that any known or later developed orientation of the output image information may be used without departing from the scope of this invention. After the display layout adjustments are determined, control continues to step S5800, control returns to step S5000 of FIG. 4 and immediately continues to step S6000.

Figure 7:
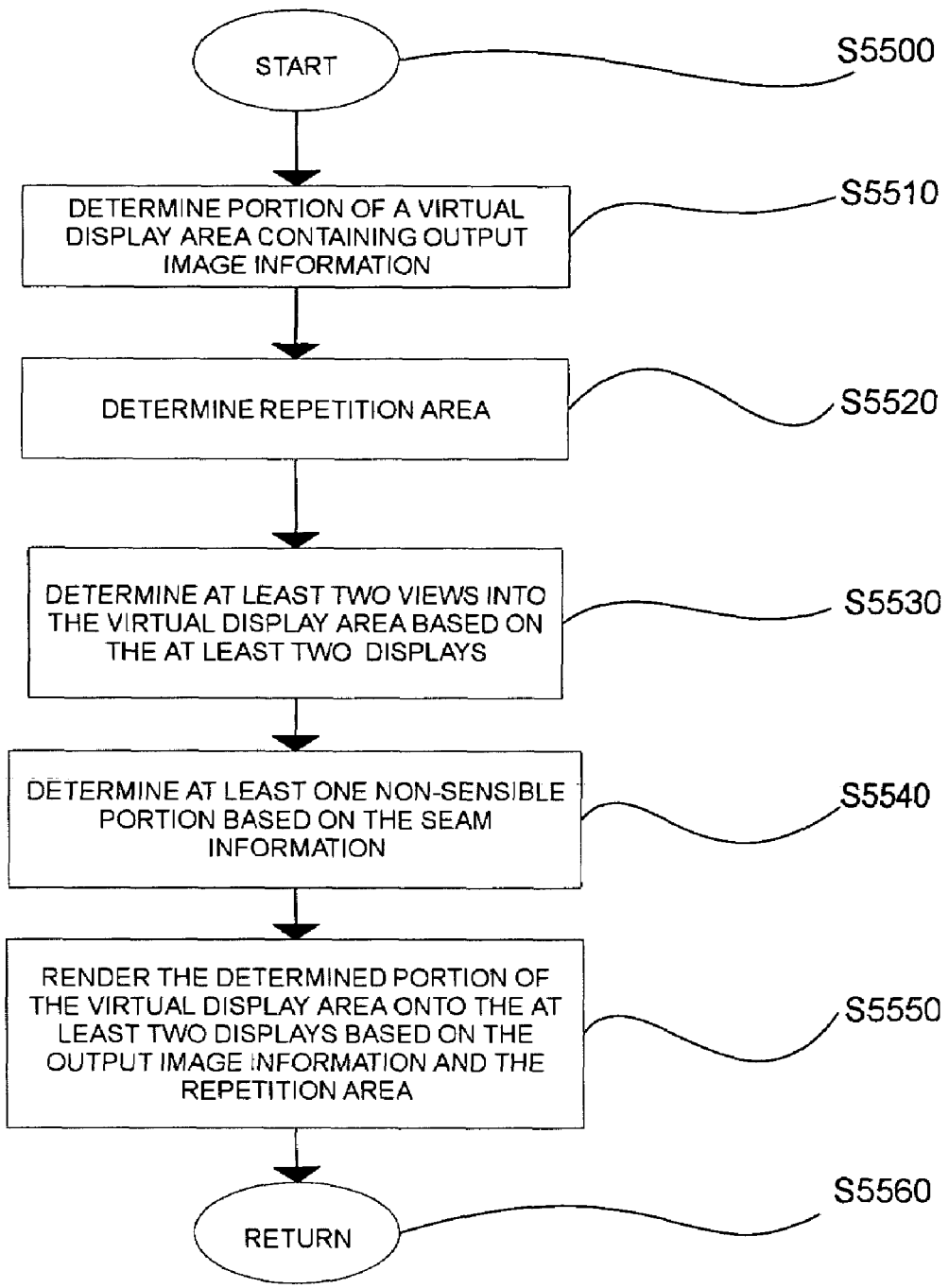
FIG. 7 is an expanded view of an exemplary method of determining repetition based layout adjustments according to an embodiment of this invention.

FIG. 7 is an expanded view of an exemplary method of determining repetition based layout adjustments according to an embodiment of this invention. The process begins at step S5500 and immediately continues to step S5510.

In step S5510, a portion of the virtual display area containing output image information is determined. After the virtual display area is determined, control continues to step S5520 where a repetition area is determined. The repetition area may be based on the size of the display, a user selection or any other criteria useful in selecting the size of the repetition area. Thus, a first display capable of displaying 100 columns may be associated with a repetition area that extends 10 columns from columns 90-100. The output image information in the first display area is repeated in the first 10 columns of the subsequent display. The last 10 columns of each $N^{th}$ display are repeated onto the first 10 columns of the $N+1^{th}$ display. This allows contextual information to be provided across the interrupting seams of a composite display. It will be apparent that right to left, bottom to top or any known or later developed orientation of output image information may be used in the practice of this invention. Moreover, it will be apparent that any number of seams may be managed without departing from the scope of this invention. Control then continues to step S5530.

At least two views into the virtual display space are determined in step S5530. The size of the displays determines the amount of output image information that can be displayed in a view. For example, a 100 column wide display with a 10 column repetition area displays 100 columns in the first display. Subsequent displays, except the last display have two 10 column repetition portions. Thus, subsequent displays provide for the display of 90 columns of new output image information. The repetition areas may be based on pixels or other known or later developed graphic units. After the at least two views into the virtual display space are determined, control continues to step S5540.

In step S5540, the information associated with at least one seam area is determined. The seam area corresponds to the area between discrete displays in a composite display. Thus, in various exemplary embodiments according to this invention, an augmented termcap or device configuration file contains seam information for each type of display device used. In still other exemplary embodiments according to this invention, a seam measuring/seam calibration routine and/or tool is used to determine the seam information directly. However, it will be apparent that any method of determining seam information may be used without departing from the scope of this invention. After the seam area is determined, control continues to step S5550.

The determined portion of the virtual display area and the determined repetition areas are drawn onto the at least two displays in step S5550. Since the repetition areas bracket both sides of the seam, they provide support and/or orientation for the user. Control then continues to step S5560 and returns to step S5500 of FIG. 6 and continues to step S5800.

Figure 8:
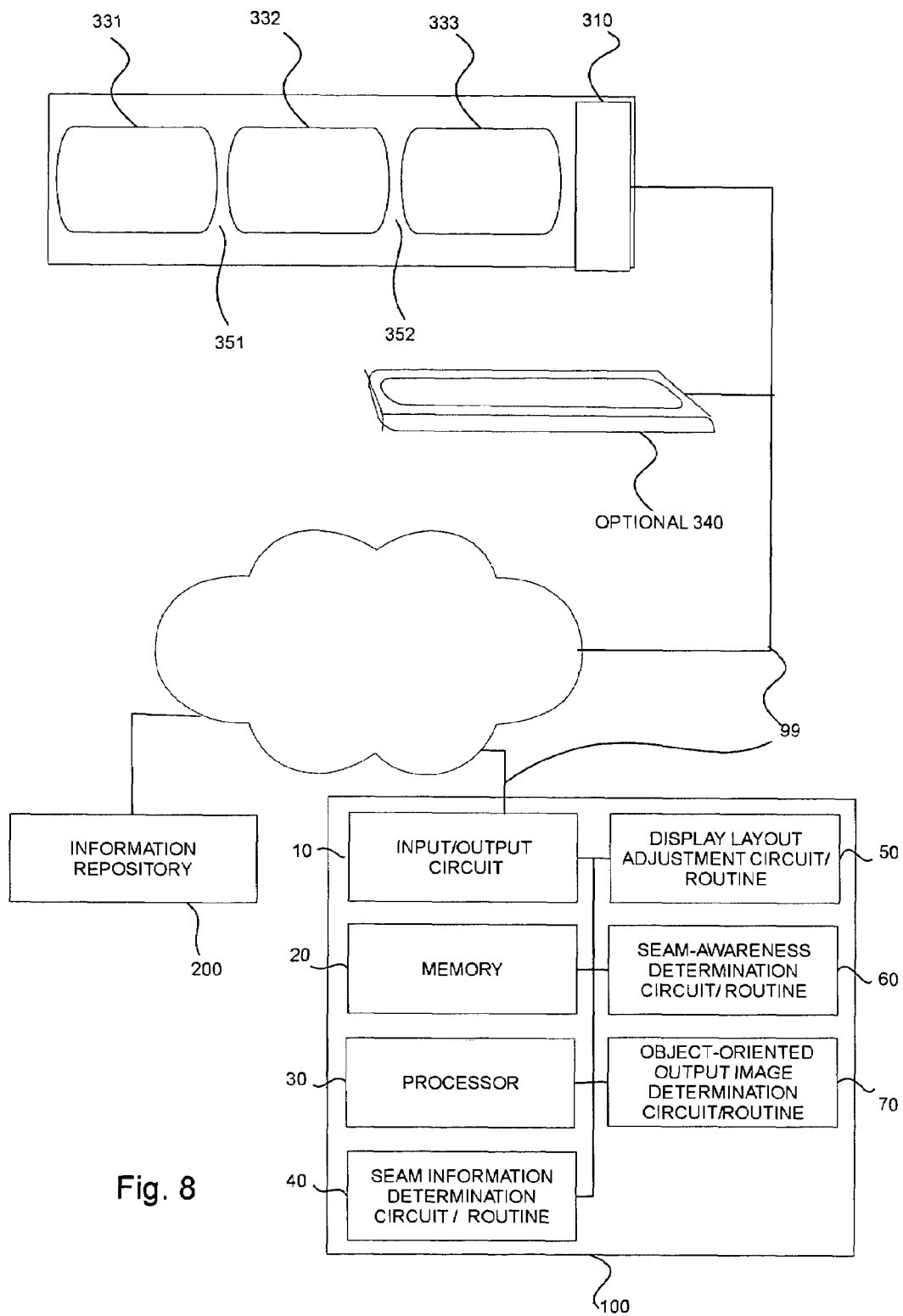
FIG. 8 is an exemplary seam manager or system according to an embodiment of this invention.

FIG. 8 is an exemplary seam manager or system 100 according to an embodiment of this invention. The seam manager or system 100 is comprised of a memory 20, a processor 30, a seam information determination circuit or routine 40, a display layout determination circuit or routine 50, a seam-awareness circuit or routine 60, an object-oriented output image determination circuit or routine 70, each connected to input/output circuit 10 and via communications link 99 to information repository 200 and composite e-paper wideband display 300. The exemplary composite e-paper wideband display 300 is comprised of discrete displays 331-333 separated by seams 351-352, an optional input device 340 and an optional display controller 310.

The seam manager or system 100 integrates the composite e-paper wideband display 300 by mitigating the effect of the seams that occur between the discrete displays 331-333.

In various exemplary embodiments according to this invention, a user of the composite e-paper wideband display 300 requests the display of output image information from a spreadsheet stored in the information repository 200. The large size of the composite e-paper wideband display 300 allows the simultaneous presentation of much of the user's requested information. The seam manager or system 100 manages the seams between the discrete displays 331-333, minimize the intrusiveness of the seams to form an integrated composite display.

The processor 30 of the seam manager or system 100 determines the seam information associated with the discrete displays 321-323 by activating the seam information determination circuit 40. The seam information may be determined dynamically, retrieved from a seam information memory, determined based display identifiers, measured and/ or entered manually or determined using any known or later developed means of determining seam information.

The processor 30 then determines the output image information. The output image information may be obtained at the application, operating system, video driver or at any other level. The processor 30 then determines output information at or near the determined seams by activating the object-oriented output image determination circuit 60. Addressable object-oriented output image information at or near the seam is determined. The addressable object-oriented output image information is then clipped and moved off the seam.

The display layout adjustments circuit or routine 50 is activated to moves interrupted output image information off the seams. Depending on user selections and or settings, the connecting output image information affected by the moved output image information is drawn through the seam. In various other exemplary embodiments according to this invention, user selections and or default settings, the portions of the output image information interrupted by seams are copied from a first side of the seam to a second side of the seam. For example, the words of a text interrupted by a seam are repeated from the display before the seam to the display following the seam. The repetition of the context on either side of the seam helps maintain continuity as the focus of attention crosses the seam. This helps to integrate the discrete displays 331-333 into a single integrated composite display.

In various exemplary embodiments, the seam-awareness circuit or routine 60 is activated to determine if the application generating the output image information is seam-aware. If the application is seam-aware, the seam information is used as a constraint in the output image information generated by the application.

Figure 9:
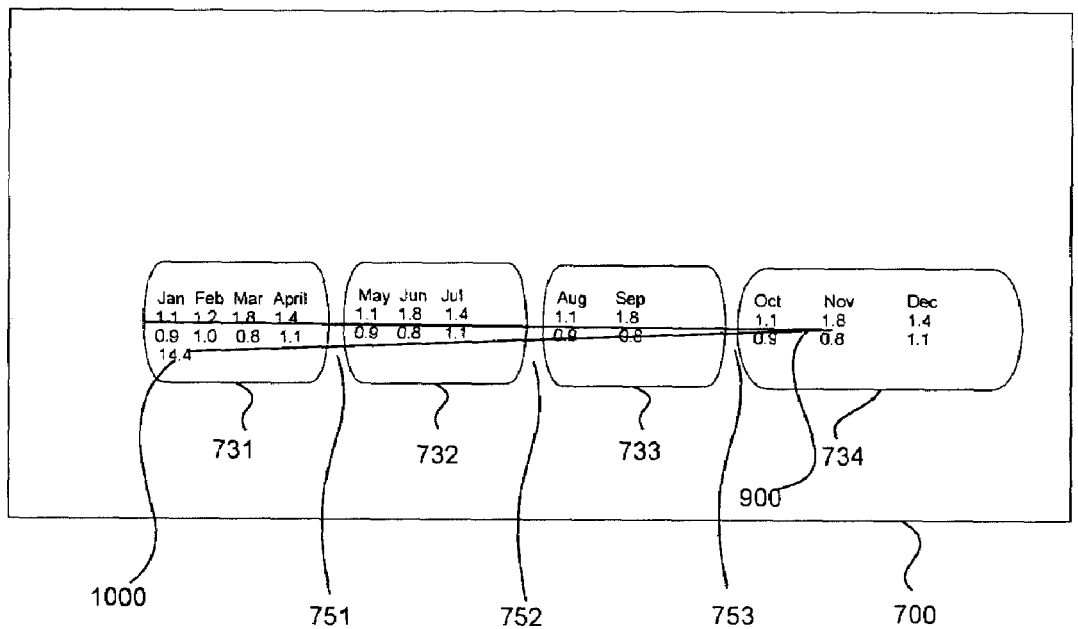
FIG. 9 is an overview of an exemplary composite display according to an embodiment of this invention.

FIG. 9 is an overview of an exemplary composite display 700 according to an embodiment of this invention. The composite display 700 is comprised of first, second, third and fourth displays 731-734. Seams 751-753 occur between each of the first, second third and fourth based displays 731-734 respectively.

An exemplary attention shifting display element 900 is the output image information drawn across the first, second, third and fourth e-paper displays. Attention shifting display elements are further described in co-pending co-assigned U.S. patent application Ser. No. 10/687,486, entitled "Systems and Methods for Shifting Attention".

The attention shifting display element 900 is used to inform the user of information outside the focus of attention. The seam manager or system integrates the portions of the display elements over each discrete display by dynamically selecting display techniques that reduce the intrusive effect of the seams. For example, in various exemplary embodiments according to this invention, an interpolable attention shifting display element is drawn across the multiple discrete display as if the interrupting seams 751-753 were active display areas. This allows the information to be easily followed and reinforces the perception of a large single integrated display system.

Figure 10:
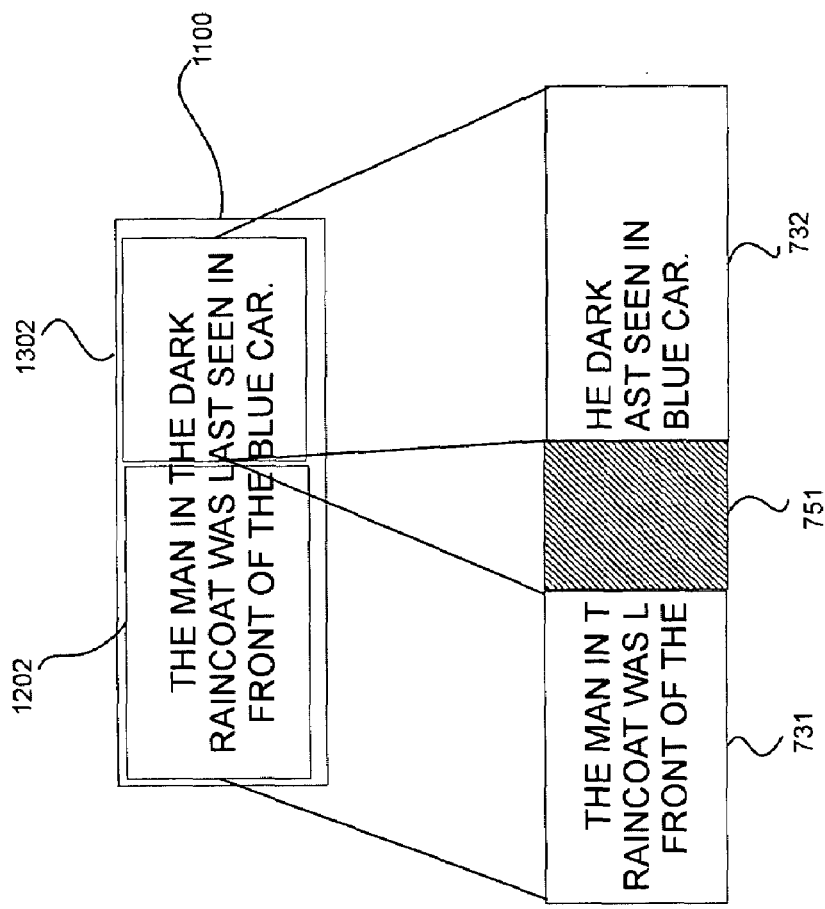
FIG. 10 shows a first virtual display area.

FIG. 10 shows a first virtual display area 1100. First and second displays 731-732, each separated by a seam 751, are associated with a first view 1202 and a second view 1302 into the virtual display area 1100.

The text "The man in the dark raincoat was last seen in front of the blue car" appears across the first and second views 1202 and 1302 of the virtual display area 1100. When displayed on the composite first and second displays 731-732, a seam 751 interrupts the flow of the text.

Figure 11:
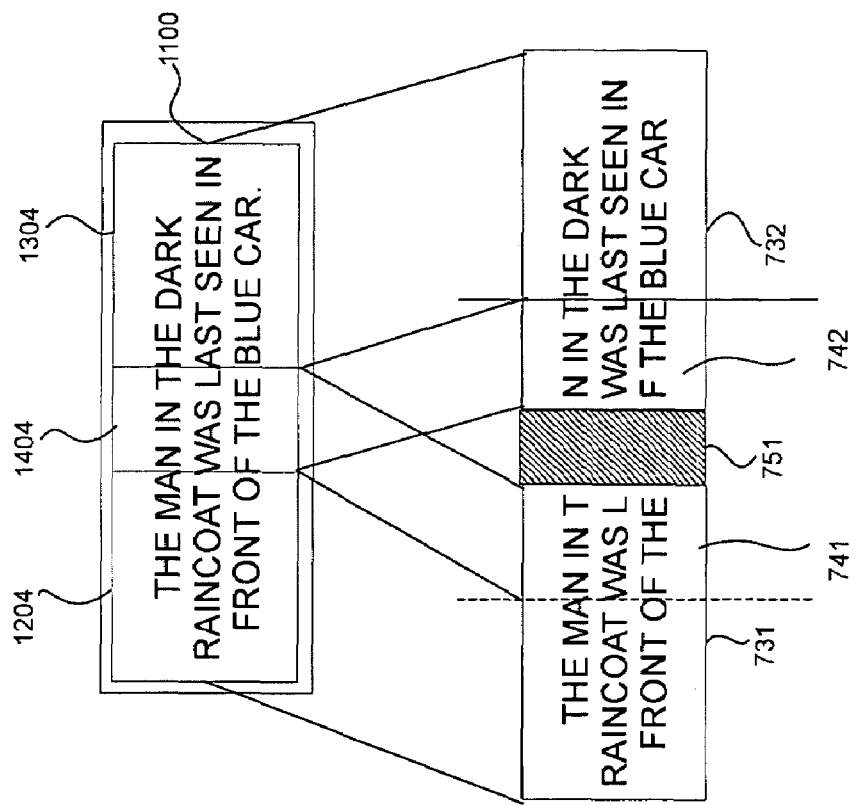
FIG. 11 shows a second virtual display area.

FIG. 11 shows a second virtual display area 1100. First and second displays 731 and 732, separated by a seam 751, are associated with a first view 1204 and a second view 1304 respectively into the virtual display area 1100. The first display 731 has a repetition area 741 immediately preceding the seam 751. The second display 732 has a repetition area 742 immediately following the seam 751. The overlapping area 1404 between the first view 1202 and the second view 1302 defines the context that will be repeated across the two displays.

The first line of the virtual display 1100 contains the portion of the phrase "The man in t" in the first view 1204. The portion of the phrase, "he dark" appears in the second view 1304 of the virtual display space 1100. The phrase "The man in t" is rendered onto the first display 731. The output image information from the overlapping area 1404 is rendered onto the repetition portion 741 of the first display 731 and the repetition portion 742 of the second display 732. The repetition of the output image information allows the user to quickly re-focus attention after a seam interruption within the high context linguistic information. Since the effect of the seam is reduced, the information is more easily assimilated and integrated into information retrieval, analysis and synthesis tasks. Similarly, the second and third lines of the virtual display repetition area 1404 are repeated over the first display 731 and the second display 732.

Figure 12:
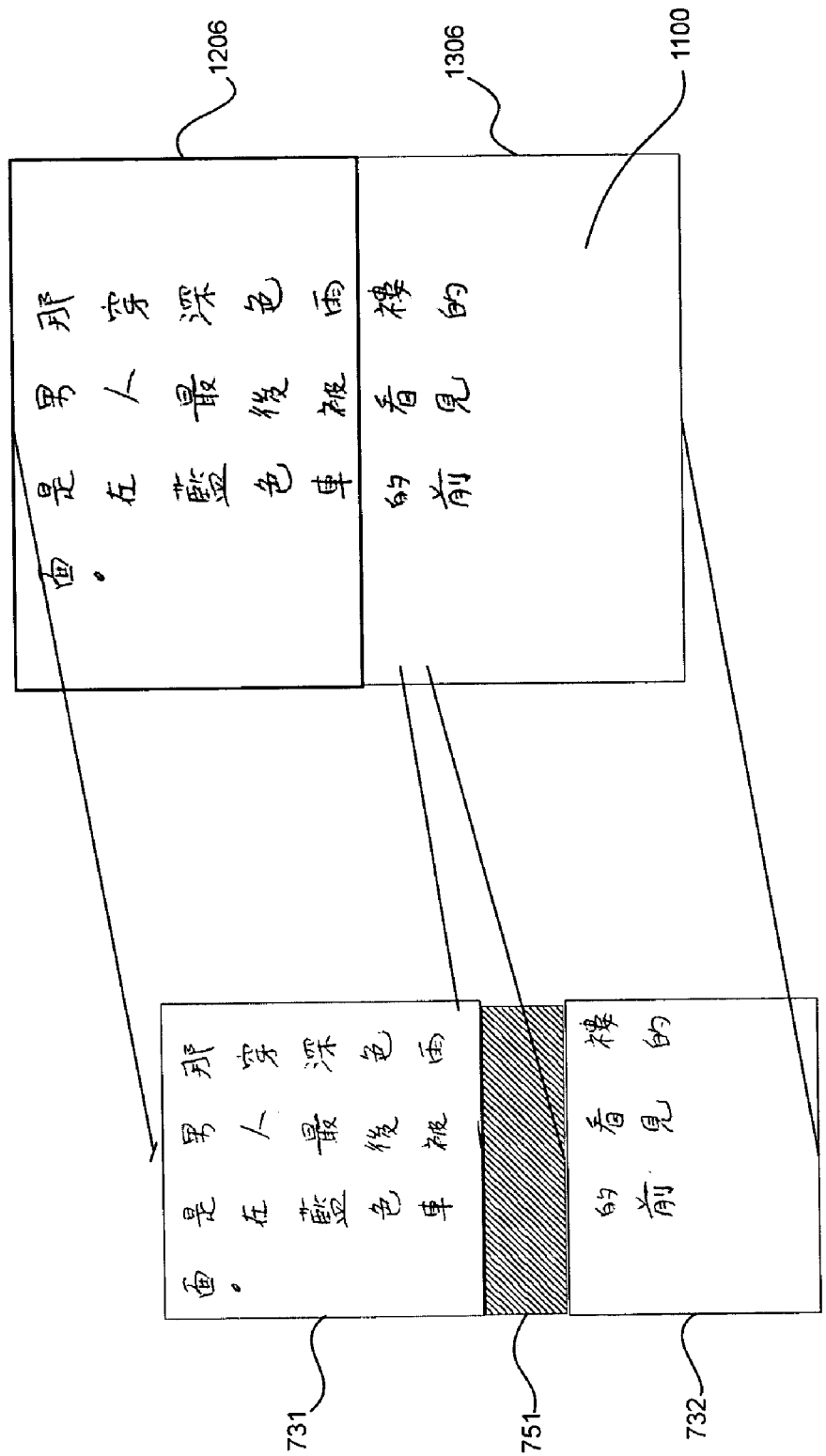
FIG. 12 shows the conventional display of output image information.

FIG. 12 shows the conventional display of output image information. A first display 731 is associated with a first view 1206 into a virtual display space 1100. A second display 732 is associated with a second view 1306 into the virtual display space 1100. A seam 751 occurs between the first display 731 and the second display 732. Chinese language characters corresponding to the English language sentence, "The man in the dark raincoat was last seen in front of the blue car" are rendered across the first and second displays 731-732. A formal Chinese text orientation of top to bottom and right to left results in the interruption of the text. In particular, only one of the two characters for the term for "raincoat" appears at the bottom right of the first display 731. When the user scans across the horizontal seam 751, the second character in the term for raincoat is encountered on the second display 732. The lack of context linking the two characters makes the output image information difficult to understand. Since the seam interrupts the flow of the output image information, the perception of a single integrated composite display is lessened.

Figure 13:
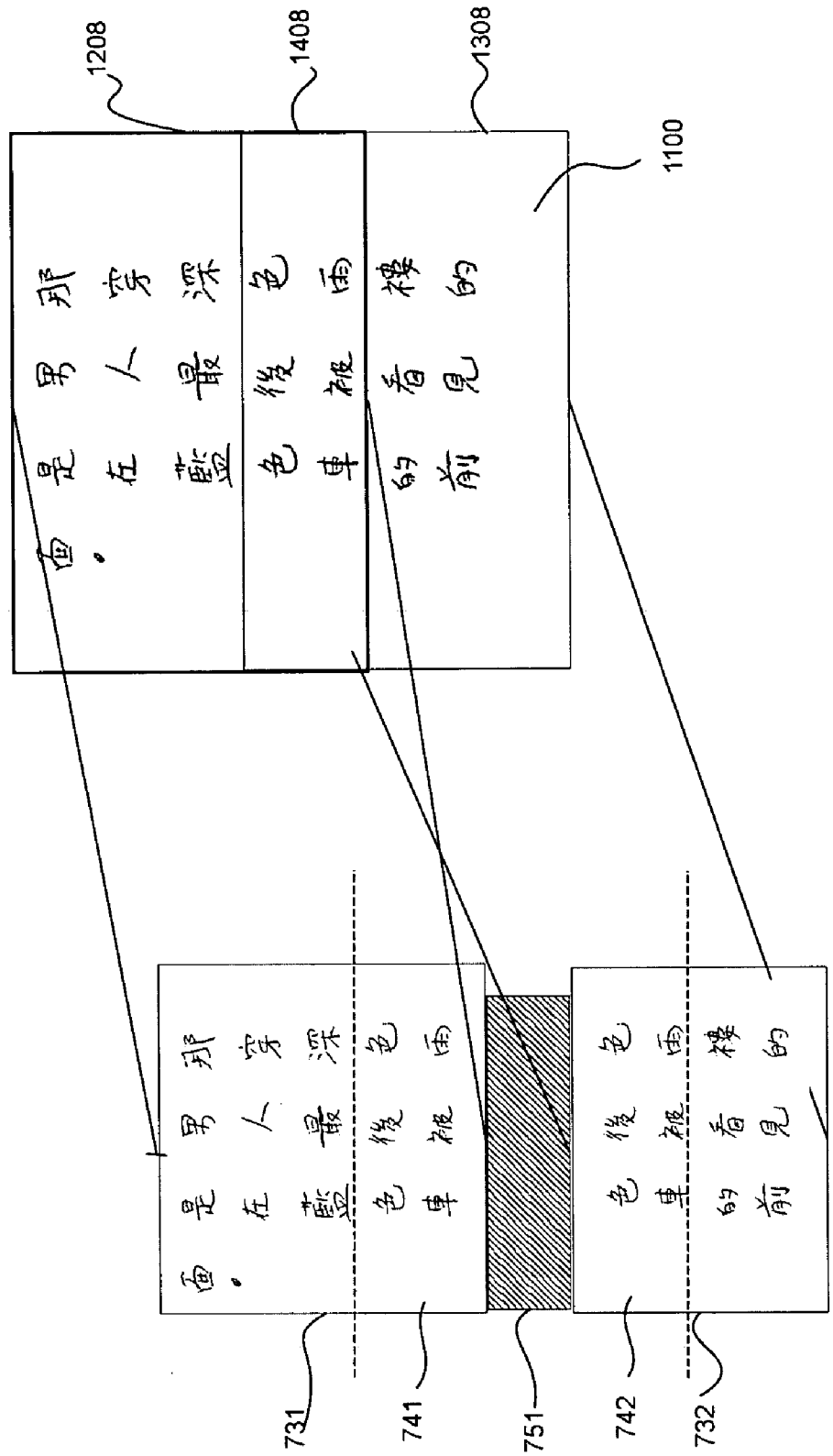
FIG. 13 shows an exemplary display of output image information according to an embodiment of this invention.

FIG. 13 shows an exemplary display of output image information according to an embodiment of this invention. The first display 731 is associated with a first view 1208 into the virtual display space 1100. The second display 732 is associated with a second view 1308 into the virtual display space 1100. An overlapping area 1408 is defined by the overlap between the first view 1208 and the second view 1308.

The first display 731 has a repetition area 741 that displays output image information from the overlapping area 1408 in the virtual display space 1100. The second display 732 has a repetition display area 742 that displays output image information from the overlapping area 1408. It will be apparent that in various other exemplary embodiments according to this invention, the repetition area 742 of the second display 732 may directly repeat output image information from the first repetition area 741 of first display 731.

A seam 751 interrupts the Chinese characters for "raincoat". However, the presentation of the interrupted information in the repetition area 742 of the second display 732 maintains the focus on the high context linguistic information.

Figure 14:
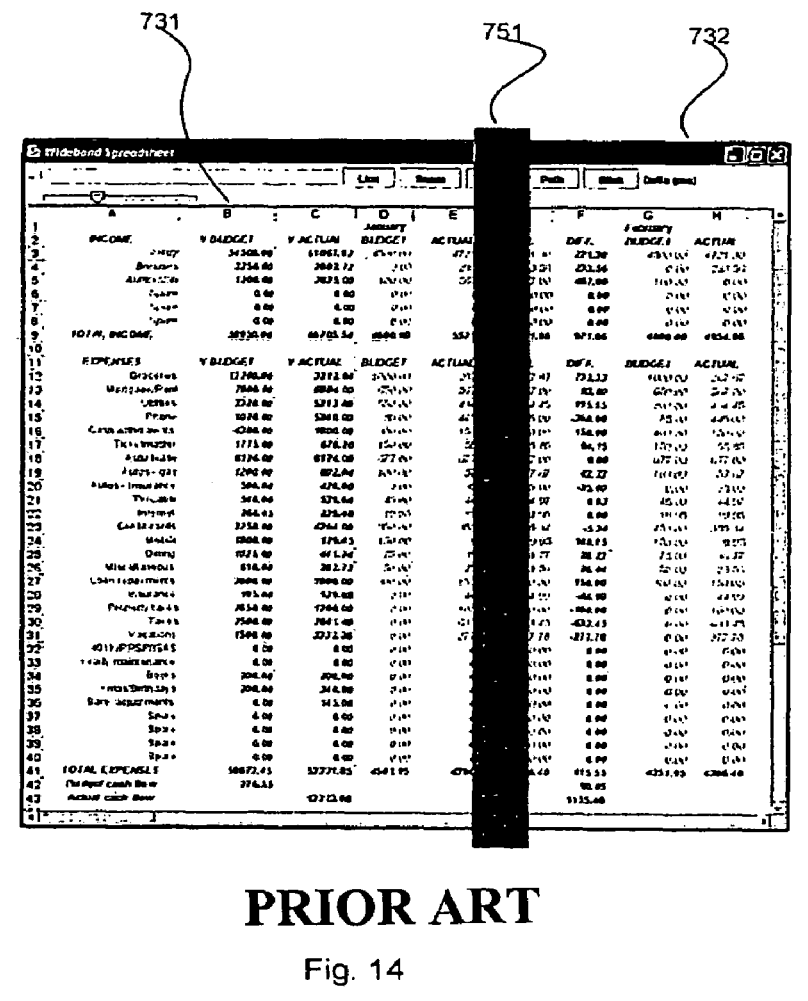

FIG. 14 shows conventional output image information generated by a non-seam-aware spreadsheet application. The output image information from the spreadsheet application spans a first display 731 and a second display 732 interrupted by the seam 751. The output image information from spreadsheet columns A-E appears in the first display 731. The output image information from spreadsheet columns F-H appears in the second display 732. The seam 751 interrupts the output image information displayed in column E. The interrupting seam 751 makes it difficult to compare and analyze the values in the interrupted column. Moreover, the interruption of column E distracts attention from information retrieval and/or analysis tasks.

Figure 15:
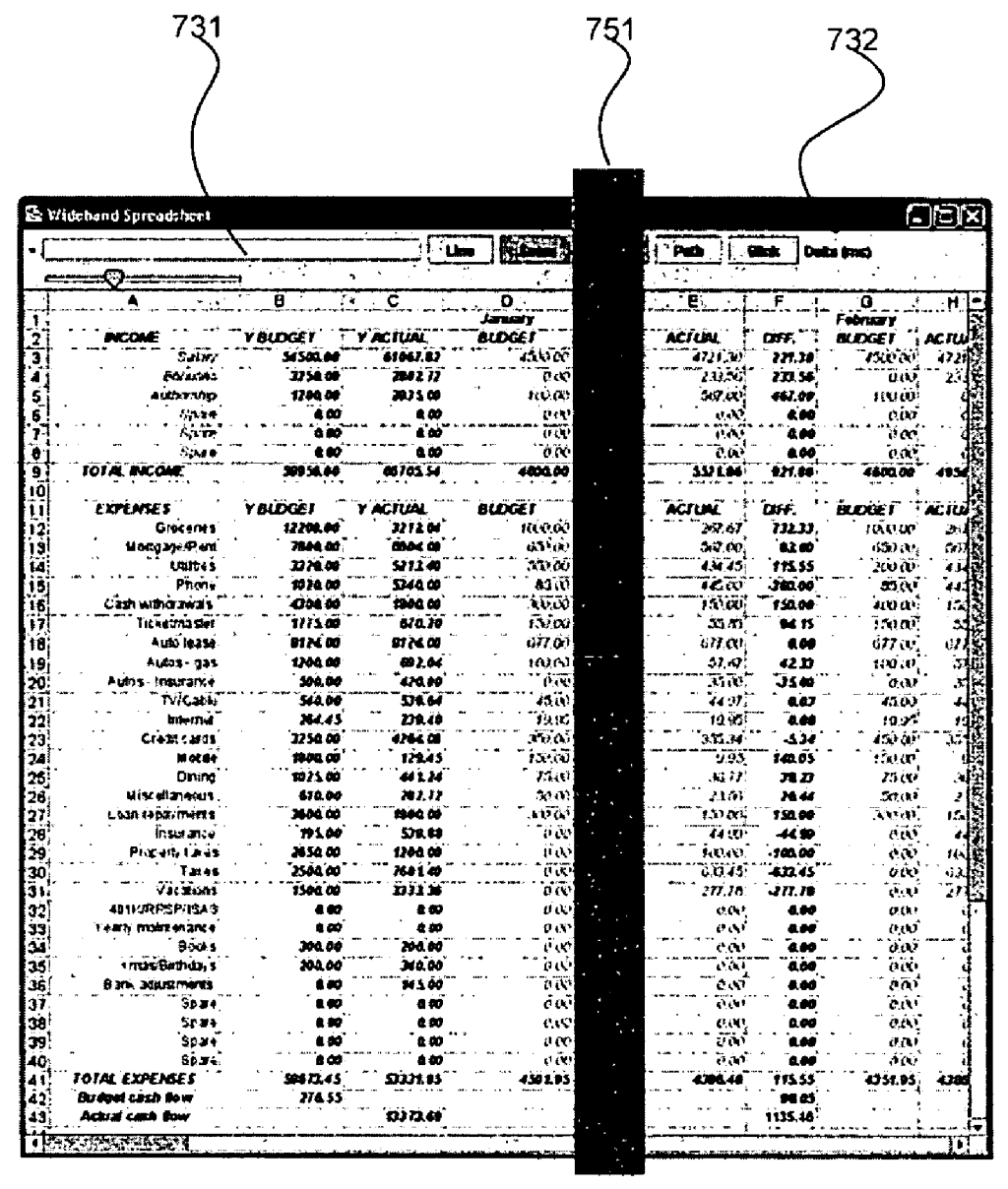

FIG. 15 shows output image information generated by an exemplary seam-aware spreadsheet application according to an embodiment of this invention. Columns A-D of the output image information span the first display 731. Columns E-H of the output image information span a second display 732. The seam 751 separates columns D and E. However, since the seam-aware spreadsheet application has applied display layout adjustments to constrain the output image information to flow around the seam, no interruption of the output image information occurs. The first four columns of output image information are presented in the first display 731. The embedded seam manager or routines of the seam-aware spreadsheet application have moved all of the output image information associated with column E to the second display 732.

FIG. 16 shows conventional output image information generated by a graphics application. The seam 751 separates a first display 731 from a second display 732. The seam 751 interrupts the first, second, third and fourth nodes 761-764.

FIG. 17 shows exemplary output information generated by a graphics application according to an embodiment of this invention. The important first second, third and fourth nodes 761-764 are moved off the seam 751. The arcs connecting the second node 762 to the third node 763 are then re-drawn across the seam 751.

Figure 18:
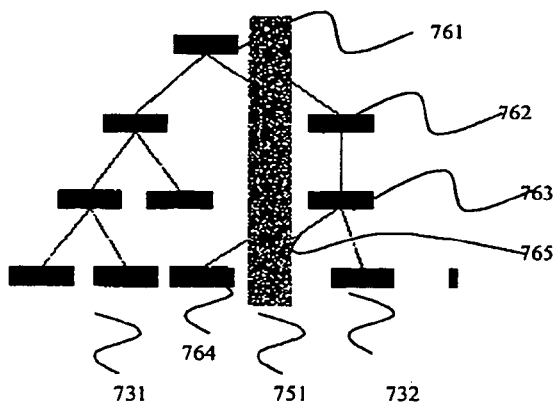
FIG. 18 shows a conventional display of output image information.

FIG. 18 shows a convention display of output image information. The output information contains first, second third and fourth nodes 761-764. The width of the seam 751 has been increased to illustrate the interruption caused by the misaligned arcs connecting nodes on the first display 731 to nodes on the second display 732. The arcs connecting nodes on the first display 731 to the nodes on the second display 732 are misaligned. The misaligned arcs distract the user's focus of attention from the information content of the display and do not reinforce the perception of the discrete displays 731-732 as a single integrated display. For example, the seam 751 interrupts the arc 765 between third node 763 and fourth node 764. The seam interruption distorts the expected alignment of the arc and distracts attention from the informational content of the output image information.

Figure 19:
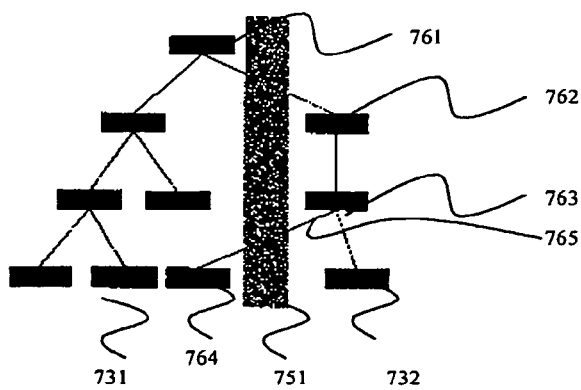
FIG. 19 shows the display of exemplary output image information according to an embodiment of this invention.

FIG. 19 shows the display of exemplary output image information according to an embodiment of this invention. Misaligned arcs connecting the nodes on either side of the seam 751 are adjusted to redraw the arcs through the seam 751. The arcs are drawn as if the seam 751 were an active display area. The user interpolates the omitted portions of the arc drawn through the seam 751. Thus, the arc segment in the first display 731 is perceived as connected to the arc segment in the second display 732. In this way, the effect of the seam on the presentation of the output image information is reduced and the perception of the display as a single integrated display is increased.

Figures 20, 21, 22:
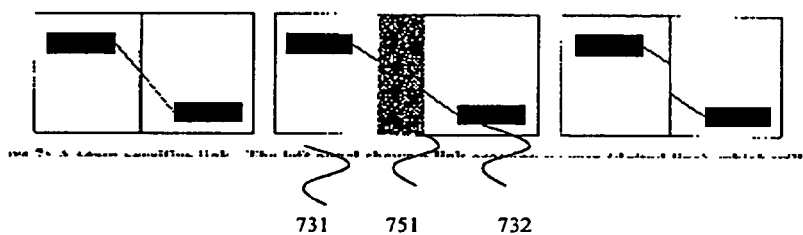
FIG. 20 shows a multi-monitor display.
FIG. 21 shows a composite display according to an embodiment of this invention.
FIG. 22 shows an overview of display layout adjustments according to an embodiment of this invention.

FIG. 20 shows a multi-monitor display. A first node on a first display 731 connected via an arc to a second node on a second display 732. Since the seam 751 has no width, the arc in first display 731 is directly aligned with the arc in the second display 732. This illustrates conventional multi-monitor display technologies in which the physical dimensions of the seam are ignored.

FIG. 21 shows a composite display according to an embodiment of this invention. A first node on a first display 731 is connected via an arc rendered and aligned across the seam 751 to a second node on a second display 732. The arc is drawn through the seam and reinforces the perception of the composite display as a single large display.

FIG. 22 shows an overview of display layout adjustments according to an embodiment of this invention. The arcs between the nodes are drawn as if the seam were active display area. However, the removal of the seam and juxtaposing the first display 731 directly adjacent to the second display 732 without the interrupting seam tends to highlight the display layout adjustments. The misalignment of the arcs reflects the display layout adjustments performed to interpolate between arcs across the original width of seam.

FIG. 23 shows an exemplary data structure for storing bezel based seam information 1500 according to an embodiment of this invention. The data structure for storing bezel based seam information 1500 is comprised of a device identifier portion 1510, a device name portion 1520, an edge identification portion 1530 and a bezel based seam portion 1540.

The device identifier portion 1510 is used to associate bezel based seam information with a particular type of monitor or display device. The device name portion 1520 identifies the name of the monitor or display device for which bezel based seam information is to be stored. For example, the first row of the exemplary data structure for storing bezel based seam information 1500 contains the value "A1DE" in the device identifier portion 1510 and the value "NEC MultiSync 5A" in the device name portion 1520.

The edge identifier portion 1530 contains the value "left" while the bezel based seam portion 1540 contains variable coordinates "{X1, Y1; X2, Y2; X3, Y3; X4, Y4}". The first row indicates that a bezel based seam area defined by the values of the variables "{X1, Y1; X2, Y2; X3, Y3; X4, Y4}" and appearing at the left edge of an "NEC MultiSync 5A" display device, is associated with the device identifier "A1DE". Thus, the seam area between two NEC monitors of this model includes the bezel based seam area on either side of the seam. In various exemplary embodiments according to this invention, the notation, seamInformation[1]=("NEC MultiSync 5A".bezelInformation.rightedge+"NEC MultiSync 5A".bezelInformation.leftedge) is used to determine the dimensions of the seam between two NEC MultiSync 5A monitors. The bezel based seam information is stored in an augmented termcap file and/or any known or later developed storage structure useful in storing bezel based seam information.

FIG. 24 shows an exemplary data structure for storing seam information 1600 according to an embodiment of this invention. A seam identifier portion 1610 contains the value that identifies the seam within the composite display. A seam information portion 1620 contains information about the size of the identified seam. The first row of the exemplary data structure for storing seam information 1600 contains "0" as the seamidentifier and "'NEC MultiSync 5A".bezelInformation.topedge+"NEC MultiSync 5A".bezelInformation.bottomedge', in the seam information portion 1620. This indicates that Seam "0" in the composite display is comprised of the top and bottom bezel based seam information for a "NEC MultiSync 5A" type of display device. It will be apparent that in various other exemplary embodiments according to this invention, the seam information may be encoded directly, determined dynamically or entered using any known or later developed method. The second row of the exemplary data structure for storing seam information 1600 contains the value "1" in the seamidentifier portion 1610 and the values "1024,0; 1030,0; 1030,768; and 1024,768" in the seam information portion 1620. This indicates that seam "1" is a rectangle having a width of 6 units and height of 768 units with respect to the origin of the coordinate system. Similarly, the fourth row of the exemplary data structure for storing seam information 1600 contains the value "3" in the seam identifier portion 1610 and the values "0,0, −10,0, −10,768, and 0,768" in the seam information portion 1620. This indicates that dimensions of the seam identified as seam "3" are defined as a rectangle of 10 units width and 768 units height with respect to the origin of the coordinate system. The seventh row of the exemplary data structure for storing seam information 1600 contains the value "9" in the seamidentifier portion 1610 and the values "2000, 2000; 2010, 2010; 2020, 2005; 2015, 1990; and 2010, 1990 in the seam information portion 1620. These values define the pentagon shape associated with the dimensions of the identified seam "9". The seam information portion 1620 may contain values defining any number of polygon coordinates or any known or later developed method of encoding the dimensions of an area.

Each of the circuits 10-70 of the seam manager or system 100 outlined above can be implemented as portions of a suitably programmed general-purpose computer. Alternatively, 10-70 of the seam manager or system 100 outlined above can be implemented as physically distinct hardware circuits within an ASIC, or using a FPGA, a PDL, a PLA or a PAL, or using discrete logic elements or discrete circuit elements. The particular form each of the circuits 10-70 of the seam manager or system 100 outlined above will take is a design choice and will be obvious and predicable to those skilled in the art.

Moreover, the seam manager or system 100 and/or each of the various circuits discussed above can each be implemented as software routines, managers or objects executing on a programmed general purpose computer, a special purpose computer, a microprocessor or the like. In this case, seam manager or system 100 and/or each of the various circuits discussed above can each be implemented as one or more routines embedded in the communications network, as a resource residing on a server, or the like. The seam manager or system 100 and the various circuits discussed above can also be implemented by physically incorporating the seam manager or system 100 into a software and/or hardware system, such as the hardware and software systems of a web server or a client device.

As shown in FIG. 8, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1-3 and 8 can each be any known or later developed device or system for connecting a communication device to the seam manager or system 100, including a direct cable connection, a connection over a wide area network or a local area network, a connection over an intranet, a connection over the Internet, or a connection over any other distributed processing network or system.

In general, the communication links 99 can be any known or later developed connection system or structure usable to connect devices and facilitate communication.

Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of managing seams comprising the steps of:
   determining a composite output display comprising at least two external displays, each display associated with a view into a contiguous virtual display space and being separated from an adjacent display by a seam that defines an area that cannot display output information;
   determining seam information associated with the seam area between the at least two displays;
   determining output information;
   determining display layout adjustments for output information associated with views into the contiguous virtual display space, the display layout adjustments being based on the determined seam information and the output information; and
   displaying the output information for each display based on the determined display layout adjustments,
   where determining layout adjustments based on the determined seam information and output information comprises at least one of:
   determining display layout adjustments based on seam constrained movement of object elements and output information by adjusting an object element originally determined to be output across two adjacent displays and the intervening seam area to move off the seam area for display on only one of the two adjacent displays; and
   determining display layout adjustments based on output information and at least one virtual display space repetition area defined in a region around the seam by adjusting output information originally determined to be output in the at least one repetition area to be repeated in two adjacent displays to provide contextual guidance for the display.

2. The method of claim 1, where the seam information is determined based on at least one of: a dynamic determination, retrieving stored display information, determined manually.

3. The method of claim 2 wherein the seam information is dynamically determined based on sensor information.

4. The method of claim 2, wherein manually determining the seam information comprises measuring the area between the displays.

5. The method of claim 1, where determining the seam information based on retrieving stored display information comprises:
   determining display information for the at least two displays; and
   adding bezel based seam information for each of the at least two displays.

6. The method of claim 1, where determining the output information for each display associated with a view comprises intercepting output information from at least one of: the application level; the operating system level; the device driver level; and the video memory level.

7. The method of claim 1, where the repetition areas are based on at least one of pixels, characters, words and sentences.

8. The method of claim 1, where movements of seam constrained object elements are based on at least one of: simulated annealing, constraint satisfaction, physical modeling, user history, nearest point-to-nearest-point, heuristics, and algorithms.

9. The method of claim 8, where the output information is displayed in the seam.

10. The method of claim 1, where the display layout adjustments are performed by the output information generator.

11. The method of claim 1, wherein the at least two displays are discrete displays and every image on the at least two discrete displays is displayed.

12. A system for managing seams in composite display system comprising:
   an input/output circuit;
   a memory;
   a processor for determining output information to be displayed;
   a seam information determination circuit that determines seam information for a seam between at least two external adjacent output displays that cannot display output information;
   a display layout adjustment circuit that determines display layout adjustments for the output image information associated with views into a contiguous virtual display space, the display layout adjustments being based on the determined seam information and the output information, and where the processor displays the output information for each display based on the determined display layout adjustments,
   wherein the display layout adjustment circuit determines layout adjustment by at least one of: (1) seam constrained movement of addressable object elements where the layout of addressable objects originally determined to be output across two adjacent displays and the intervening seam area is adjusted to move off the seam area for display on only one of the displays, and (2) defining of repetition areas around the seam and adjustment of the layout so that output information originally determined to be output in one of the repetition areas is repeated in two adjacent displays to provide contextual guidance for the display.

13. The system of claim 12, where the seam information is determined based on at least one of: a dynamic determination, retrieving stored display information, determined manually.

14. The system of claim 13, where the seam information is dynamically determined based on sensor information.

15. The system of claim 13, where manually determining the seam information comprises measuring the seam between displays.

16. The system of claim 12, where the seam information determination circuit determines seam information by determining bezel based display information for the at least two displays and determining seam information by adding bezel based seam information for the at least two displays.

17. The system of claim 12, where determining the output image information for each display is based on intercepting the output information from at least one of: an application level, an operating system level, a device driver level, and a video memory level.

18. The system of claim 12, wherein the repetition area is based on at least one of pixels, characters, words and sentences.

19. The system of claim 12, wherein seam constrained movement is based on at least one of: simulated annealing, constraint satisfaction, physical modeling, user history, nearest-point-to-nearest-point, heuristics and algorithms.

20. The system of claim 19, wherein adjusted output image information is displayed in the seam.

21. The system of claim 12, wherein the display layout adjustment determination is performed by the generator of the output image information.

22. The system of claim 12, wherein the at least two displays are discrete displays and every image on the at least two discrete displays is displayed.

23. A computer readable storage medium encoded with a computer program comprising instructions for:
    determining a composite output display comprising at least two external displays, each display associated with contiguous views into a virtual display space and being separated from an adjacent display by a seam that defines an area that cannot display output information;
    determining seam information for at least one seam area between the at least two displays;
    determining output information;
    determining display layout adjustments for each of the at least two displays associated with the views into virtual display space, the display layout adjustments being based on the determined seam information and the output information; and
    displaying the output information for each display based on the determined display layout adjustments,
    where determining layout adjustments based on the determined seam information and output information comprises at least one of:
        determining display layout adjustments based on seam constrained movement of object elements and output information by adjusting an object element originally determined to be output across two adjacent displays and the intervening seam area to move off the seam area for display on only one of the two adjacent displays, and
        determining display layout adjustments based on output information and at least one virtual display space repetition area defined in a region around the seam by adjusting output information originally determined to be output in the at least one repetition area to be repeated in two adjacent displays to provide contextual guidance for the display.

24. The computer readable storage medium of claim 23, wherein the at least two displays are discrete displays and every image on the at least two displays is displayed.

25. A system of managing seams comprising:
    a means for determining a composite output display comprising at least two external displays, each display associated with a view into a contiguous virtual display space and being separated from an adjacent display by a seam that defines an area that cannot display output information;
    a means for determining seam information associated with the seam area between the at least two displays;
    a means for determining output information;
    a means for determining display layout adjustments for output information associated with views into the contiguous virtual display space, the display layout adjustments being based on the determined seam information and the output information; and
    a means for displaying the output information for each display based on the determined display layout adjustments,
    wherein the means for determining display layout adjustments determines the layout adjustments by at least one of: (1) seam constrained movement of addressable object elements where the layout of addressable objects originally determined to be output across two adjacent displays and the intervening seam area is adjusted to move off the seam area for display on only one of the displays, and (2) defining of repetition areas around the seam and adjustment of the layout so that output information originally determined to be output in one of the repetition areas is repeated in two adjacent displays to provide contextual guidance for the display.

26. The system of claim 25, wherein the at least two displays are discrete displays and every image on the at least two displays is displayed.

* * * * *